March 26, 1957  A. A. WOLF  2,786,334
REFRIGERATING SYSTEM AND ELECTRICAL COMPONENTS THEREOF
Filed Dec. 28, 1953  4 Sheets-Sheet 1

INVENTOR.
Alfred A. Wolf
BY
Attorney

March 26, 1957 — A. A. WOLF — 2,786,334
REFRIGERATING SYSTEM AND ELECTRICAL COMPONENTS THEREOF
Filed Dec. 28, 1953 — 4 Sheets-Sheet 2

INVENTOR.
Alfred A. Wolf
BY
Attorney

INVENTOR.
Alfred A. Wolf
BY
*R. Herenafrest*
Attorney

March 26, 1957 A. A. WOLF 2,786,334
REFRIGERATING SYSTEM AND ELECTRICAL COMPONENTS THEREOF
Filed Dec. 28, 1953 4 Sheets-Sheet 4

INVENTOR.
Alfred A. Wolf
BY
Attorney

United States Patent Office 2,786,334
Patented Mar. 26, 1957

2,786,334

REFRIGERATING SYSTEM AND ELECTRICAL COMPONENTS THEREOF

Alfred A. Wolf, Dallastown, Pa., assignor to Fidelity Instrument Corporation, York, Pa., a corporation of Pennsylvania Application December 28, 1953, Serial No. 400,576

13 Claims. (Cl. 62—4)

This invention relates to a refrigerating system, particularly adapted to mobile refrigerating plants, and provides an improved drive which may be used to connect the variable speed propelling engine of a motor vehicle with a relatively small compressor-condenser-evaporator refrigerating unit, as compared with larger, fixed systems, for affording refrigeration to said mobile plant.

Heretofore, such drives, when electrical, have usually comprised direct current generators and motors and, usually, also a storage battery. Because these are heavy and expensive, attempts have been made to use alternating current, but the systems proposed have involved frequency changers and similar complicated accessories. As a consequence, neither weight nor expense was saved.

There is a strong incentive to use alternating current machines because the best small refrigerating circuits particularly are of the hermetically sealed type. Such a circuit demands the use of an alternating current motor.

Conceding that a constant speed compressor is commonly desirable, still a hermetic circuit can be operated acceptably at variable compressor speeds, and even at speeds which are as variable as those of automotive engines.

Hence the invention contemplates an A. C. generator driven by the propelling engine at speeds proportional to varying engine speed, a refrigerating circuit of the hermetic type whose A. C. motor is in circuit with said A. C. generator, and regulating means for the output voltage of the generator to cause this voltage to vary in direct relation to frequency. The refrigerating circuit may be an ordinary commercial type, designed for 60 cycle current at 110 or 220 volts.

The invention also contemplates exciting the generator by current which is diverted from the main output of the generator, the voltage regulator maintaining the supply of exciting current so as to cause the voltage output of the generator to vary directly in proportion to the frequency thereof, thereby eliminating the need for auxiliary or separate exciting devices.

There are important advantages. For example, the refrigerating unit is standard and can be operated by current from local power lines when the vehicle is garaged. The generator and motor are light, and much less expensive than comparable D. C. units would be. No battery is needed, although in one embodiment of the invention, a battery may be used to supply the exciting current which is otherwise controlled by the voltage regulating means of the invention.

Contrary to accepted inhibitions in the art, these advantages can be had at a very small penalty; namely the use of voltage regulating means, and acceptance of such inefficiency as is inherent in operating, at variable rates, a refrigerating circuit designed primarily for operation at a constant rate.

Several types of voltage regulator are available, and as to efficiency, the compressor speed can be so chosen in relation to normal road speeds of the engine that satisfactory performance is had.

Somewhat similar A. C. circuits have been used in large ship-propulsion attended units, but so far as is known no one has perceived the possibility of small fully automatic units, nor has anyone prior to the present invention appreciated the acceptability of variable speed drive for hermetic units, particularly those using fixed long restrictors, or the feasibility of diverting a portion of the output current of the generator of such a system and variably controlling and utilizing the same to excite the generator for the intended purpose.

Preferred embodiments of the invention now will be described by reference to the accompanying drawings.

Figure 1:
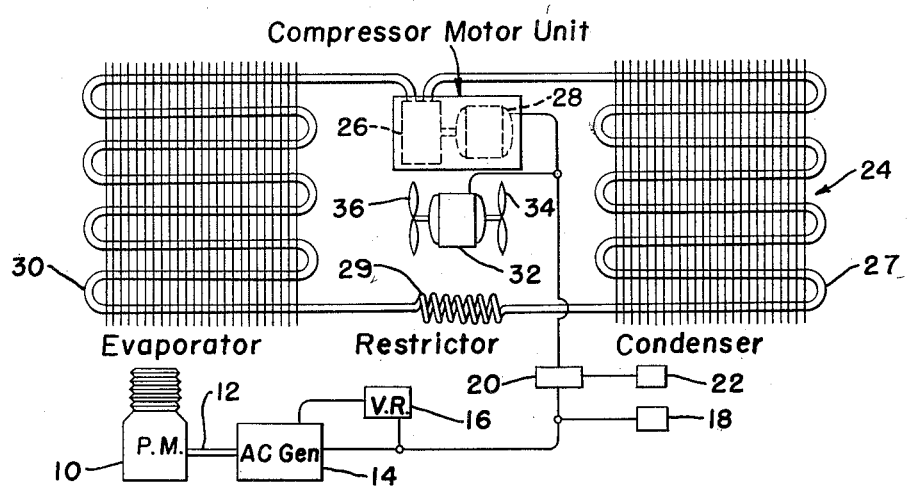
Fig. 1 is a diagrammatic illustration of a refrigerating system embodying the principles of the present invention, said system being applicable to any installation utilizing a variable speed prime mover.

Considering the invention more specifically, it comprises a refrigerating system having an electric power system to operate the same, the latter including a variable speed prime mover of any suitable type and particularly one associated with a mobile vehicle such as a motor truck, motor bus, passenger automobile, railway car axle, or the like. Said prime mover drives, in direct speed relation thereto, a variable speed A. C. generator which supplies A. C. current to operate an A. C. motor, preferably of conventional induction type, either single or multiphase, and a voltage regulator connected in a circuit between the output terminals and D. C. exciter coil of the generator maintains the voltage of the generator, which is supplied the motor, in direct proportion to the speed of the generator. The driven motor accordingly is driven at variable speeds throughout all useful ranges without harm and in direct ratio to the speed of the generator which is controlled by the speed of the prime mover.

An A. C. motor is an inductive device and in such device, the voltage drop is proportional to the back E. M. F. generated by that inductive device. The amount of back E. M. F. generated for a given inductance will vary almost directly with the frequency of the A. C. voltage applied. Therefore, in order to operate an A. C. motor of the squirrel cage type, for example, with a variable frequency current, a variable voltage, varying directly in proportion to the frequency of the applied current, must be supplied to the motor. This voltage must also be supplied so that it will remain fairly constant from no load to full load of the motor at a given speed of the motor.

Hence, if both the frequency and voltage supplied a conventional A. C. induction type motor are varied in direct ratio to each other, the motor will operate safely over a relatively wide range of speeds. To achieve such proportional variation of the frequency and voltage for the motor by simple, reliable, and relatively inexpensive means is one of the essential features of the present invention.

In heavy power installations such as large ship propulsion systems where expense, weight and size, and complex nature of the power system are not regarded as particularly critical, systems have been developed which operate relatively high power rated A. C. motors at variable speeds by a generator driven at proportional speeds by a prime mover operating at variable speeds. In such systems however, the exciter coil of the generator is energized usually by a heavy duty, separate current supplying mechanism, due to the high current requirements to achieve such excitation.

As far as is known however, no electric power system of this nature has been developed heretofore which diverts part of the current developed directly by the generator and regulates and conditions said current to render it suitable to excite the coil of the generator. Such latter system is feasible in relatively small capacity electric power systems which use a variable speed prime mover to generate current of proportionately varied voltage and frequency to drive an A. C. motor at variable speeds in ratio therewith, and especially motors having a power rate less than 10 H. P.

An electric power system of this type is suited admirably to operate a refrigerating system and particularly renders such refrigerating system useful in any type of vehicle operated at variable speed, the prime mover or a driven member of the vehicle being utilized to drive the generator of the power system at correspondingly variable speeds.

The system comprising the present invention also makes possible the use of standard commercial refrigerating units and especially those including sealed motor-compressor units such as now are used, for example, in room air conditioning units. Sealed motor-compressor units of this type can only use A. C. motors and, as has been stated above, such A. C. motors and the control requirements therefor are far less costly and of less weight than corresponding D. C. equipment of equivalent power rating, as well as other vehicle type refrigerating units employing auxiliary gasoline engines and the like.

The simplicity of the power system of the present invention for the intended purpose is made possible largely by employing therein a voltage regulator for controlling and conditioning the current diverted from the generator which is used to excite the D. C. coil of the generator in a suitable manner so that the voltage of the output current for the motor of the refrigerating system will be varied directly in proportion to the frequency of the current.

Usual voltage regulators are designed to maintain a constant voltage regardless of frequency. However, the voltage regulator used in the above described system utilizes an inductive type dropping impedance in place of a resistive type unit as a sensing element to maintain the proper voltage. By providing a regulator in which the internal impedance is almost completely inductive, the measured voltage will vary directly in proportion to the frequency applied, since the back E. M. F. generated in the inductance varies directly with the frequency. Therefore, this regulator differs in general from those conventionally used in that the internal impedance used to measure the line voltage of the generator consists almost entirely of inductance with as little resistance as possible.

Figure 7:
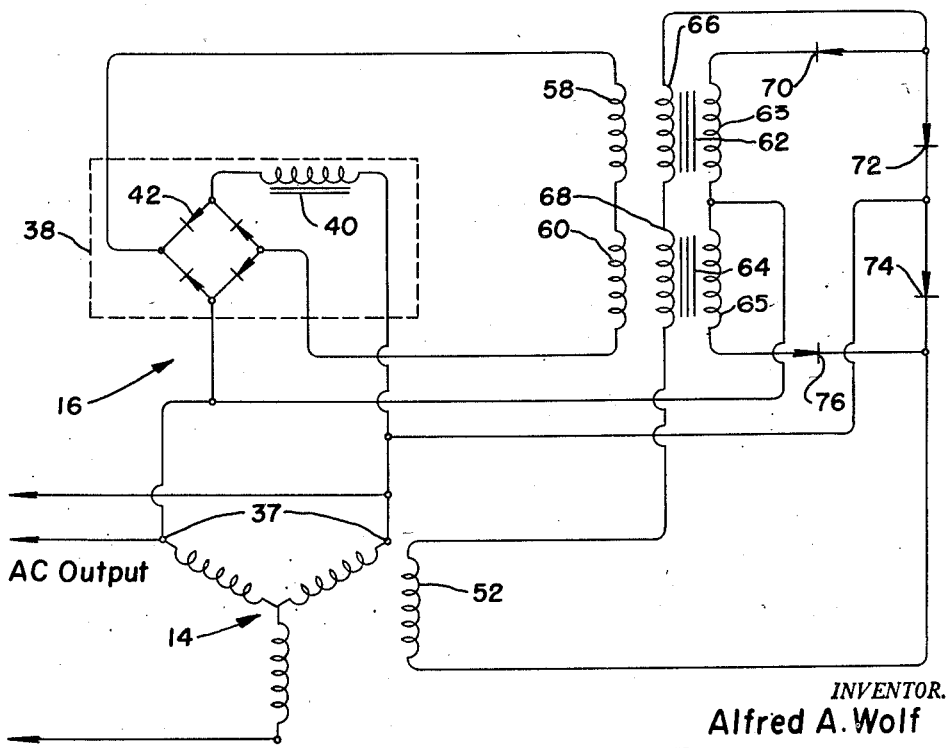
Fig. 7 is a diagrammatic illustration of the components and circuit of still another embodiment, also partially similar to the embodiment shown in Fig. 5 but utilizing a saturable reactor in the amplifier in lieu of the vibrating reed mechanism shown in Fig. 5.
Figure 5:
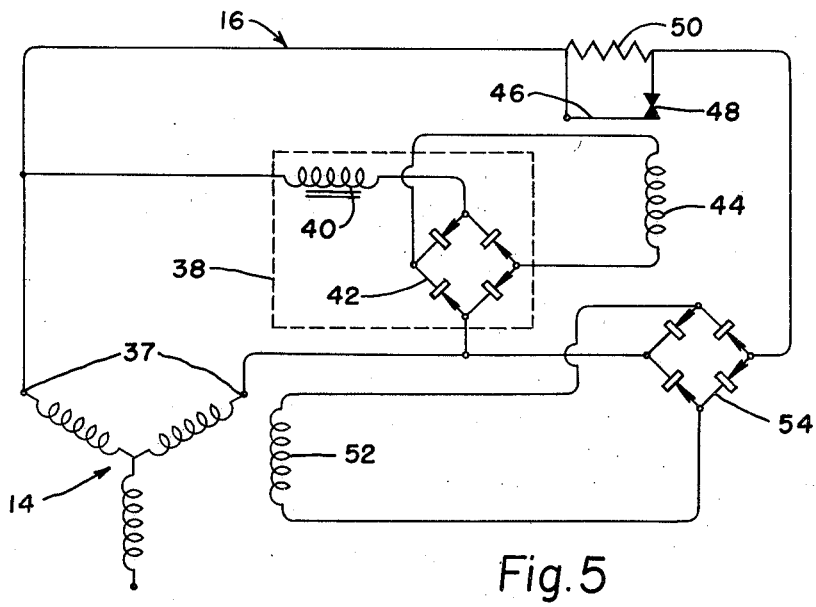
Fig. 5 is a diagrammatic illustration of the components and circuit of one embodiment of voltage regulator contemplated for the electric system illustrated in Fig. 2, this regulator being electro-mechanical in operation and utilizing solely current diverted from the generator.
Figure 6:
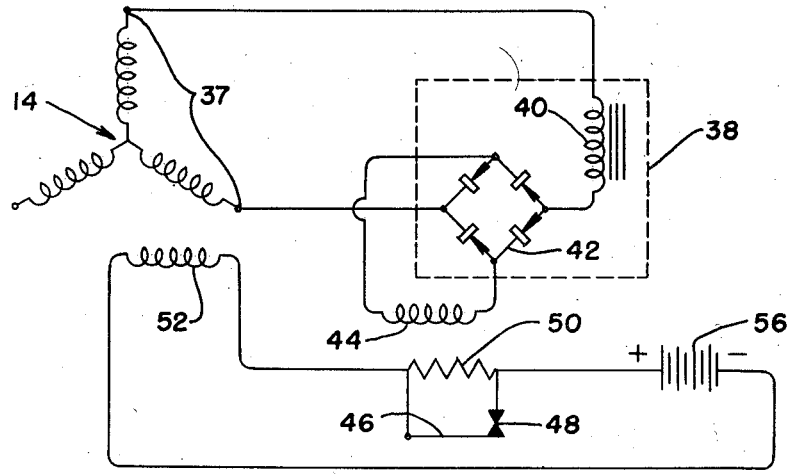
Fig. 6 is a diagrammatic illustration of the components and circuit of another embodiment of voltage regulator, partially similar to the embodiment shown in Fig. 5 but utilizing an independent source of D. C. exciting current and varying the supply of the same to the exciter of the generator in accordance with the frequency thereof.

Referring to the drawings, an exemplary refrigerating system embodying the principles of the present invention is shown in Fig. 1. Referring thereto, a variable speed prime mover 10, of any appropriate kind and having a drive shaft 12, is interconnected to an A. C. generator 14 including conventional rotating field and stator windings. Voltage regulator 16, of a type described in detail hereinafter, is connected between the output terminals and exciter coil thereof, the details of which are shown in Figs. 5 through 7 and are described hereinafter. A master control switch 18, preferably manual, is also connected in the output circuit of the generator. For controlling the output circuit in accordance with refrigeration demands, a multiple-pole switch 20 also is mounted in said output circuit, the same preferably being of the magnetic contactor type. The switch 20 is controlled by any suitable thermostatic switch 22 which is responsive to the refrigerating demands of the system. The electrical units described above are connected by a suitable circuit described in detail hereinafter relative to Figs. 2 and 3.

The refrigerating system or unit 24 includes a compressor 26 driven directly by an A. C. motor 28. The latter is driven by current from generator 14 at speeds directly in proportion to the speed thereof. Refrigerating system 24 also comprises a condenser 27 connected by a restrictor 29 in refrigerating circuit with an evaporator 30. Another A. C. motor 32, having exemplary fans 34 and 36 on opposite ends thereof, also is driven by current from generator 14 and the fans move air respectively over the condenser and evaporator coils. The successful operation of this system in installations of limited refrigerating capacity, less than 10 H. P. for example, is possible principally by virtue of diverting a portion of the generator current and conditioning and controlling it for purposes of suitably energizing the D. C. exciter coil of the generator.

As stated above, several different types of voltage regulators are feasible to achieve the desired results of the present invention. It is to be understood that these regulators are not equivalents of each other in that they have different characteristics which will render them best suitable for specific installations depending upon the desired capacity of the system and the specific requirements of any particular system selected to achieve a desired purpose. Three such voltage regulators are illustrated respectively in Figs. 5, 6 and 7. Referring first to the voltage regulator shown in Fig. 5, suitable conductors of said regulator are connected to output terminals 37 of generator 14 as is clearly shown in said figures.

Said voltage regulator comprises in combination a sensing or measuring unit 38 which includes an inductance 40 of square hysteresis loop material. This inductance is set or adjusted so that, preferably, approximately 90% of the generated voltage is dropped across the inductor. Also included in the sensing unit 38, in series with the inductance 40, is a rectifier 42 for purposes of converting the A. C. current flowing through the inductance 40 to D. C. The output of the sensing unit 38 is fed to coil 44. If however, the coil 44 is designed for A. C. current rather than D. C., the rectifier 42 may be omitted. The coil 44 is a voltage regulator type relay similar to that used universally in power generators, automobile generators and the like.

By way of example of operation of the regulator 16 shown in Fig. 5, assume the generator is running momentarily at 3600 R. P. M. and is generating 60 cycle current. As the voltage of the generator output increases from zero to 90% of the intended line voltage, practically no current will flow through inductance 40, except a very small magnetizing current. When 90% of the intended output voltage is produced by the generator, and as the generator voltage increases, current will commence flowing through coil 44. Magnetic force will be generated by coil 44 and such force will attract actuator 46, breaking contact points 48. When the contacts 48 are separated, resistor 50 will be embodied between the generator output and the rotating field 52 of the generator.

Another rectifier 54 is included in the circuit between resistor 50 and rotating field 52 to change the A. C. output of the generator to D. C. inasmuch as a D. C. magnetizing or exciting current is required by the rotating field 52. When the voltage flowing through the coil 44 increases to a predetermined value, actuator 46 will be attracted by said coil and opens the contacts 48. Then, the current through the rotating field 52 immediately commences to decay because resistor 50 is in the circuit to the rotating field 52. The voltage of the generator then immediately commences to fall and, in turn, the current through coil 44 immediately starts to decrease, releasing actuator 46 and permitting contacts 48 to close.

The foregoing operation sets up a very rapid vibrating condition of the contacts 48 and the system of the voltage regulator will be stabilized at a value of output voltage which is desired. As the load of the generator increases, the percentage of time that the contacts 48 are closed increases, thereby regulating the voltage of the generator. As the frequency of the generator increases or decreases, the voltage drop across inductance 40 increases or decreases accordingly, causing the complete system to operate at a higher or lower voltage.

As a further example, an increase in frequency of the current produced by the generator increases the drop across inductance 40. However, with the increase in voltage produced by the generator due to the increased speed, the current through the coil 44 remains substantially constant, causing the contacts 48 to remain closed approximately the same period of time. But, it is necessary to have the contacts remain open for an additional period of time due to the increase in voltage of the generator and the constant voltage and current requirement of rotating field winding 52. Therefore, the actual voltage of the generator with this system will increase very slightly which will, in turn, increase the current in winding 44 enough to maintain a voltage output of the system substantially proportional to the frequency.

The voltage regulator described above and illustrated in Fig. 5 contains suitable rectifiers for converting A. C. current of the generator to D. C. for purposes of energizing the rotating field 52 of the generator. In relatively small power rated installations such, for example, as one or two H. P. capacity, it is feasible to utilize a storage battery of possibly 6 or more volts capacity in lieu of rectifier 54, if this type of system is preferred due to the requirements of a specific installation. The vehicle battery or an auxiliary battery may be used for such purpose. Under these circumstances, a voltage regulator diagram is illustrated in Fig. 6 which utilizes a battery 56 in lieu of rectifier 54 of the regulator shown in Fig. 5. Otherwise, all of the other components of the regulator shown in Fig. 6 are similar and correspond in function to the similarly identified elements of the regulator shown in Fig. 5. In the regulator shown in Fig. 6, the D. C. supply fed to the rotating field 52 from battery 56 nevertheless is controlled by the contacts 48 and the resistor 50, whereby the results of the regulator 16 shown in Fig. 6 are similar to that shown in Fig. 5 for purposes of varying the output voltage of the generator in proportion to the frequency thereof as described above relative to the latter.

In Fig. 7 another voltage regulator 16 for achieving results similar to the regulators shown in Figs. 5 and 6 is illustrated.

In this regulator a saturable reactor and rectifiers are connected between the A. C. output of the stator winding 37 and the rotating field winding 52. These reactors consist of cores 62 and 64 with power windings 63 and 65. Selenium rectifiers 70 and 76 are connected in series with these power windings to cause them to self-saturate. Feed-back windings 66 and 68 are also provided in parallel with the two power windings 63 and 65 and D. C. current will flow through these in a direction to saturate the reactors. Therefore, with the self-saturating effect of the rectifiers 70 and 76, plus the positive feed-back of windings 66 and 68, the reactor will be completely saturated when no current flows through control windings 58 and 60. The rectifiers 72 and 74, in conjunction with rectifiers 70 and 76, are provided to change the A. C. output of the saturable reactor to full wave rectified D. C. current. This current is used to excite the rotating field 52 of the generator and is fed through windings 66 and 68.

A small amount of residual magnetism will be present in the generator field by the proper selection of conventional material for the field. As the generator is rotated, this residual magnetism generates small currents in the stator windings 14. These small currents are not blocked by reactors 62 and 64 as they are self-saturating. The currents are rectified by rectifiers 72, 74, 70 and 76 and supply a small amount of D. C. to the rotating field winding 52. This increased magnetization of rotating field winding 52 increases the voltage output of the stator winding 14. This regenerative effect causes the flux and voltage of the generator to build up rapidly. When this voltage reaches a predetermined value for the particular frequency at which the generator is operating, the inductor coil 40 will saturate.

The inductor coil 40 is an inductor constructed of square hysteresis loop material and requires a very small magnetizing current up to the point of saturation. However, very large currents flow through the inductor 40 upon exceeding the saturation point by a few volts. This saturation point varies directly with the frequency. These currents are rectified by rectifier 42 and are fed through control windings 58 and 60 on the cores 62 and 64. Control windings 58 and 60 are wound to oppose the saturation of the cores 62 and 64 and, when sufficient current flows through the control windings 58 and 60, the cores 62 and 64 become partially unsaturated, reducing the current in rotating field winding 52, and a point of equilibrium is reached.

From the foregoing, it will be seen that the refrigerating system illustrated in Fig. 1 comprises a simple and effective electric power system for operating at variable speeds the various motors of the refrigerating system and, at any given speed, the voltage will be constant from no load to full load, thereby producing the required torque. Said electric system is suited admirably to operate refrigerating systems and particularly such systems having relatively low power rating, such as under 10 H. P. as distinguished from large capacity units. However, it is obvious that such electric system may be used to operate any mechanism or unit wherein it is desired to operate an A. C. motor from a generator driven at variable speeds by a prime mover which is similarly driven. Thus, the electric system of the present invention, in effect, comprises a sub-structure of the refrigerating system described hereinabove.

The refrigerating system shown in Fig. 1 has been illustrated in a diagrammatic manner with the intent that it is not to be restricted to any specific installation. However, to illustrate the adaptation of such system to a mobile unit such as a refrigerated truck, reference is now made to Fig. 2 of the drawings wherein an exemplary truck 78 is shown. This vehicle includes a refrigerating compartment 80 which is insulated suitably to contain refrigeration temperatures efficiently in either sub-freezing or sub-zero ranges or higher.

The vehicle 78 also includes a conventional engine 82 having a drive shaft 84 and pulley 86 fixed thereto for rotation in accordance with the speed of the engine. A conventional transmission 87 affords a variable ratio means for propelling the vehicle. Preferably, the power system comprising the present invention includes a separate or auxiliary A. C. generator 88 which is mounted conveniently so as to be driven directly by a belt 90 extending around the generator pulley and the motor pulley 86. A voltage regulator 92 of one of the types shown in Figs. 5 through 7 is positioned conveniently relative to the vehicle and generator 88. A manually controlled master switch 94 preferably is mounted on the dash board or instrument panel of the vehicle.

At any convenient position on the vehicle, a magnetic contactor 96 is mounted and, within the compartment 80, an automatic refrigerating control thermostat 98 is positioned. Also positioned conveniently relative to the refrigerating compartment 80 is a refrigerating unit 100. While such unit is shown specifically near the rear of compartment 80 in Fig. 2, it may be positioned at any other convenient location such as under the cab and compartment 80, as shown in dotted lines in said figure. This unit preferably includes a suitable frame and, if desired, a casing 102 which conveniently fits within a suitable opening or space in the vehicle or body. Thus, it will be seen that such refrigerating units to a large extent, may be standardized in size for specific capacity ratings, if desired.

The refrigerating unit 100 includes a motor-compressor unit comprising conventional compressor 104 which is driven by an A. C. motor 106 of suitable power rating and said compressor and motor preferably are mounted within a casing or container 108 which seals said unit hermetically. Positioned, for example, above the motor-compressor unit within the container 108 is a condenser unit 110. Said unit 110 includes an A. C. motor 112 which drives fan 114 and the compartments which enclose the condenser unit 110 as well as the motor compressor unit in container 108 are vented to the exterior of truck by louvres 116.

Mounted preferably above the condenser unit 110 is an evaporator unit 118 which includes a finned heat exchange coil 120. Also within the unit 118 is another A. C. motor 122 which drives a fan 124 in order to circulate air within the compartment 80 past the heat exchange coil 120 and discharge it through suitable openings 126 into the interior of compartment 80. If desired, one or more A. C. motor driven fans 128 may be mounted within compartment 80 to circulate the refrigerated air therein. These may be connected directly to the circuit 132.

It is to be understood that the specific arrangement of the various compartments just described such as container 108 for the sealed motor compressor unit, the condenser unit 110 and the evaporator unit 118 is only exemplary and other suitable or desirable arrangements may be made without departing from the spirit of the present invention.

Figure 2:
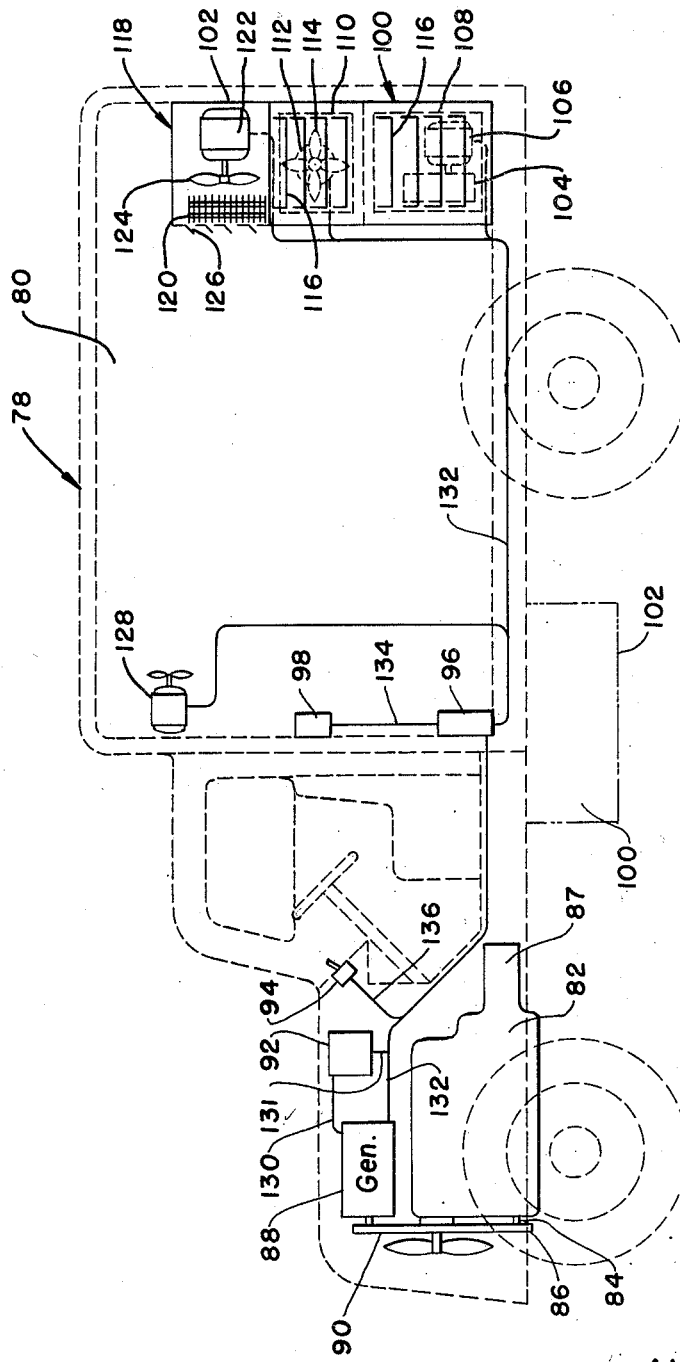
Fig. 2 is a side elevation of a diagrammatically illustrated mobile refrigerating plant embodying the refrigerating system shown in Fig. 1, a truck being shown in phantom as a specific representation of a mobile unit.
Figure 3:
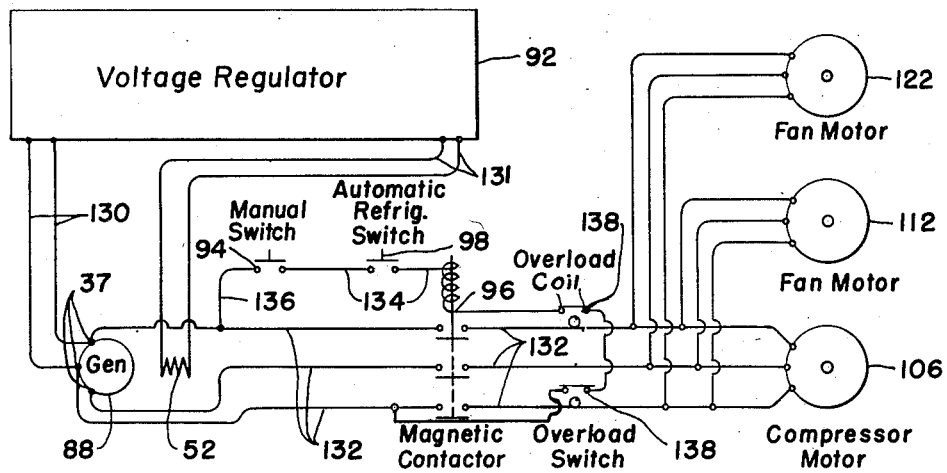
Fig. 3 is an exemplary wiring diagram of the electric system embodied in the refrigerating system shown in Figs. 1 and 2, said system comprising part of the present invention.

Fig. 3 shows a detailed exemplary wiring diagram of the system illustrated in Fig. 2. The voltage regulator 92 is connected to generator 88 by a two-wire conduit 130 and a two-wire conduit 131 connects the output of the amplifier of the voltage regulator 92 to the rotating field 52 of the generator 88. The output terminals 37 of the generator are connected by a three-wire conduit 132 to the magnetic contactor 96 and from there to the motors 106, 112 and 122. The control thermostat 98 is connected to the magnetic contactor 96 by a two-wire conduit 134. Manual control switch 94 also is connected by a suitable two-wire conduit 136 in a circuit between the control thermostat 98 and one wire of the three-wire conduit 132. The circuit to the magnetic contactor 96 also may include overload switches 138, as shown in Fig. 3.

As is obvious from Fig. 3, the motors 106, 112 and 122 are connected in parallel to the three-wire conduit 132. These motors preferably are standard A. C. motors of induction squirrel-cage type and may be either a single, split, or three-phase types. Such motors readily may be mounted within hermetically sealed containers or casings with a compressor, whereby such sealed motor-compressor units may be manufactured, tested and sealed at the factory in accordance with conventional practice now used relative to furnishing such units for other refrigerating systems such as used in room air conditioners and domestic as well as commercial refrigerators. As distinguished from using A. C. motors in this relationship, D. C. motors can not be used in such sealed units because of the requirement of attention to the brushes and the commutators of D. C. motors.

Usually, D. C. motors and control equipment therefor also are more expensive than A. C. motors, whereby the cost of a refrigerating system of the type comprising the present invention is considerably less expensive than one in which D. C. motors are used or in which an auxiliary prime mover, such as a gasoline engine or otherwise, is required for purposes of operating either an A. C. or a D. C. generator to furnish current to the motors of the refrigerating equipment of the system.

When the speed of the motor is varied in accordance with the present invention, the horsepower delivered by the motor also will vary with the result that the amount of refrigeration delivered by the refrigerating system, utilizing one or more such motors driven at variable speed, will vary in direct proportion to the horsepower delivered by the motors. However, this feature is not detrimental when refrigerating systems of this type are used in modern type refrigerating compartments in which insulation is of high efficiency and also in view of the high storage caacity of most refrigerating systems in use today. This effect is far more than offset by the fact that power systems of the type employing the principles of the present invention are much lighter in weight and less expensive to construct and maintain than other presently used systems.

In order to illustrate the operating characteristics and power requirements of an exemplary A. C. motor used to operate the compressor embodied in a refrigerating system requiring, for example, a one horsepower motor, the following table is set forth:

| Generator Speed | 1,800 R. P. M. (Minimum Speed). | 3,600 R. P. M. (Normal Speed). | 4,200 R. P. M. (Maximum Speed). |
| --- | --- | --- | --- |
| Frequency | 30 Cycles | 60 Cycles | 70 Cycles. |
| Motor Speed | 875 R. P. M. | 1,750 R. P. M. | 2,040 R. P. M. |
| H. P. | ½ H. P. | 1 H. P. | 1.18 H. P. |
| Compressor Action | ½ Normal | Normal | 1.18 Normal. |
| Fan Air | ½ Normal | Normal | (1.18)$^3$ Normal. |
| Motor Current | Normal | Normal | Slightly above Normal. |
| Motor Voltage | 115 v. | 220 v. | 256 v. |

It will be seen from the foregoing data that the power system provided by the present invention has a constant torque and this will operate over a variable speed range of limits of at least 1 to 4.

Figure 4:
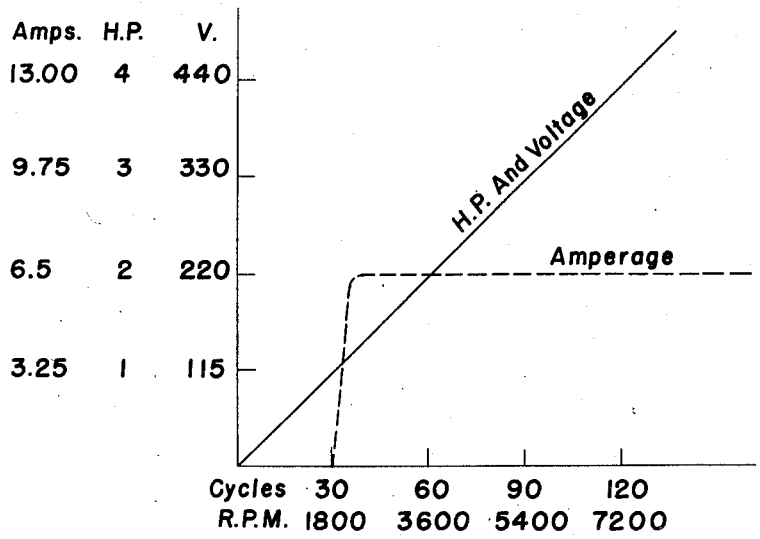
Fig. 4 is a graph illustrating current, voltage, and power characteristics of the motors of the refrigerating system illustrated in Figs. 1 and 2.

In order to illustrate in a graphic manner the characteristics of the current, voltage, and horsepower produced by the generator embodied in the present invention, reference may be made to Fig. 4 in which it will be seen that the horsepower and voltage vary directly with the speed and frequency of the generator. However, when adeqaute minimum speed of the generator is reached, the magnetic contactor 96 will close and the amperage will develop substantially instantaneously at said minimum speed to the required value for an exemplary 2 H. P. motor and said amperage then will continue uniform for any speed or frequency above said minimum speed.

In view of the foregoing, overall manufacturing, installation and maintenance costs of refrigerating systems embodying the principles of the present invention may be maintained at a minimum which is materially less than any known refrigerating systems available at present for similar uses.

While the invention has been shown and described in its several preferred embodiments, and has included certain details, it should be understood that the invention is

I claim:

1. The combination of a vehicle including a rotary driving element the speed of which varies as a necessary incident to changes of vehicle speed; an A. C. generator having a field winding, said generator being driven by said driving element at varying speed and having an output whose frequency varies similarly; D. C. means for exciting said winding; voltage regulating means responsive to said frequency variations and controlling said exciting means to vary the voltage of said output in proportion to the frequency thereof; and a refrigerating unit of the compressor-condenser-evaporator circuit type arranged to create an artificial temperature in a portion of said vehicle and including an A. C. motor-compressor unit, the motor of said unit being connected in a closed electric circuit with said A. C. generator, whereby the motor speed varies with that of the generator.

2. The combination defined in claim 1 in which the D. C. exciting means includes a rectifier connected to derive direct current from the output of the A. C. generator.

3. The combination defined in claim 1 in which the vehicle is an automobile having a propulsion unit comprising an internal combustion engine and related variable ratio transmission through which the engine drives the vehicle, said driving element being connected to be driven by said engine at a definitely related speed.

4. The combination defined in claim 1 in which the vehicle is an automobile having a propulsion unit comprising an internal combustion engine and related variable ratio transmission through which the engine drives the vehicle, said driving element being connected to be driven by said engine at a definitely related speed, and the D. C. exciting means including a rectifier connected to derive direct current from the output of the A. C. generator.

5. The combination defined in claim 1 further including a casing within which the A. C. motor-compressor unit is sealed hermetically.

6. For use with a vehicle including a rotary element the speed of which varies as a necessary incident to changes of vehicle speed; the combination of an A. C. generator interconnectable to said rotary element so as to be driven thereby at a speed directly proportional thereto; the generator having output terminals and a field winding, voltage regulating means electrically connected between said output terminals and field winding of said generator and including means operative to vary the voltage output of said generator proportionally to the frequency and the speed of said generator; and a refrigerating unit of the compressor-condenser-evaporator circuit type arranged to create an artificial temperature in a portion of said vehicle when installed therein, and an A. C. motor-compressor unit, the motor of said unit being connected in a closed electric circuit with said A. C. generator, whereby the motor is operated at a speed varying proportionately with that of the generator.

7. For use with a vehicle including a rotary element the speed of which varies as a necessary incident to changes of vehicle speed; the combination of an A. C. generator interconnectable to said rotary element so as to be driven thereby at varying speed; the generator having output terminals and a field winding, voltage regulating means electrically connected between said output terminals and field winding of said generator and including means operative to vary the voltage output of said generator in proportion to the speed thereof and also maintain the voltage of said generator substantially constant under varying loads when the frequency of the generator is constant; and a refrigerating unit of the compressor-condenser-evaporator circuit type arranged to create an artificial temperature in a portion of said vehicle when installed therein, and an A. C. motor-compressor unit, the motor of said unit being connected in a closed electric circuit with said A. C. generator, whereby the motor is operated at a speed varying proportionately with that of the generator.

8. An A. C. generator arranged to be driven at variable speeds and including rotatable field and stator windings connected to produce power of desired phase, said stator winding being operable to produce an alternating voltage and frequency proportional to the speed of said generator, in combination with a voltage regulator comprising a first saturable reactor and rectifiers connected in series therewith, a circuit connecting said first reactor and rectifiers in series with said rotatable field winding, a second saturable reactor and rectifiers connected in series with said stator winding and a circuit connecting said second reactor to said first reactor and its rectifiers, the output of said second reactor being arranged to inversely control current in said first reactor, whereby said voltage regulator is operable to produce a field flux for said generator of a value required to produce an output voltage directly proportional to the frequency thereof and the speed of said generator.

9. The combination set forth in claim 8 further characterized by the voltage regulator thereof also including current feed-back means connected in the circuit of said first reactor and operable to saturate the reactor in direct proportion to the current of the rotatable field winding, thereby resulting in the generator output voltage being constant for any constant frequency regardless of varying inductive and resistance loads imposed upon the generator.

10. A voltage regulator connectable to an A. C. generator of desired phase including a stator winding and a rotatable field winding arranged to be driven at variable speed to produce similarly variable but proportional voltage, said regulator comprising a first reactor having a control winding and rectifier connected in series therewith, said first reactor being connected to said rotatable field winding of said generator, a second saturable reactor connected to the control winding of said first reactor and connectable to the stator winding of said generator and operable to energize the control winding of said first reactor in direct proportion to the voltage of the generator, and current feed-back means connected to said first reactor and operable to saturate the same in direct proportion to the current of the rotatable field, thereby being operable to produce a constant voltage output from said stator winding for any constant frequency regardless of varying inductive and resistance loads within the capacity of the generator.

11. In combination: an alternator including generating and exciting windings; a variable speed prime mover connected to the alternator for driving the same at a speed proportional to that of the prime mover; a saturable reactor; a first rectifier; means connecting the saturable reactor and rectifier in series to the alternator output; a second rectifier; means connecting said second rectifier in circuit with said exciting winding and to the alternator output; and saturable reactor means electrically connected to said first and second rectifiers for varying the current in said exciting winding inversely with the current in said saturable reactor, thereby to maintain the generated voltage constant at a given frequency under varying load conditions and to maintain the generated voltage directly proportional to frequency.

12. In combination: an alternator including generating and exciting windings; a variable speed prime mover connected to the alternator for driving the same at a speed proportional to that of the prime mover; a saturable reactor; a first rectifier; means connecting the saturable reactor and rectifier in series to the alternator output; a second rectifier; means including a resistance means connecting said second rectifier in circuit with said exciting winding and to the alternator output; means for shorting said resistance means; and means electrically connected to said first rectifier for controlling said shorting means in accordance with the current in said saturable reactor, thereby to maintain the generated voltage constant at a given frequency under varying load conditions and to maintain the generated voltage directly proportional to frequency.

13. The combination defined by claim 12, in which the generating windings are three-phase, Y-connected and the reactor and first rectifier are connected in parallel with the second rectifier and the exciting winding to one generated line voltage.

References Cited in the file of this patent

UNITED STATES PATENTS

| | | |
|---|---|---|
| 1,353,691 | Winter | Sept. 21, 1920 |
| 1,420,885 | Stoekle | June 27, 1922 |
| 1,461,575 | Clough | July 10, 1923 |
| 2,115,472 | Sargent | Apr. 26, 1938 |
| 2,363,857 | Crever et al. | Nov. 28, 1944 |
| 2,374,012 | Hanna | Apr. 17, 1945 |
| 2,477,988 | Krabbe | Aug. 2, 1949 |
| 2,506,809 | Nims | May 9, 1950 |
| 2,586,368 | Mershon | Feb. 19, 1952 |
| 2,608,066 | Kirkpatrick | Aug. 26, 1952 |
| 2,675,518 | Morgan | Apr. 13, 1954 |

FOREIGN PATENTS

| | | |
|---|---|---|
| 19,903 | Great Britain | of 1911 |